(12) United States Patent
Autry et al.

(10) Patent No.: US 10,843,416 B2
(45) Date of Patent: Nov. 24, 2020

(54) COMPOSITE REINFORCEMENT STRUCTURES AND AIRCRAFT ASSEMBLIES COMPRISING COMPOSITE REINFORCEMENT STRUCTURES

(71) Applicant: Gulfstream Aerospace Corporation, Savannah, GA (US)

(72) Inventors: Brenden Autry, Savannah, GA (US); Bryan Williams, Savannah, GA (US); Mauro Mori, Savannah, GA (US); Mark Chapman, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 466 days.

(21) Appl. No.: 15/724,078

(22) Filed: Oct. 3, 2017

(65) Prior Publication Data
US 2018/0043639 A1    Feb. 15, 2018

Related U.S. Application Data

(63) Continuation-in-part of application No. 14/824,290, filed on Aug. 12, 2015, now Pat. No. 10,315,366.
(Continued)

(51) Int. Cl.
*B29C 70/34* (2006.01)
*B29C 70/44* (2006.01)
(Continued)

(52) U.S. Cl.
CPC .......... *B29C 70/342* (2013.01); *B29C 70/446* (2013.01); *B29C 70/542* (2013.01);
(Continued)

(58) Field of Classification Search
None
See application file for complete search history.

(56) References Cited

U.S. PATENT DOCUMENTS 1,751,957 A * 3/1930 Towle ........................ B64C 3/00
244/123.12
1,804,824 A * 5/1931 Cross ......................... B64C 3/00
244/123.12
(Continued)

FOREIGN PATENT DOCUMENTS

CN    104177110 A    12/2014
DE    1275279 B    8/1968
(Continued)

OTHER PUBLICATIONS

Canadian Intellectual Propery Office. Office Action in Application No. 2,926,962. dated Dec. 4, 2018.
(Continued)

*Primary Examiner* — Jacob T Minskey
*Assistant Examiner* — Baileigh Kate Darnell
(74) *Attorney, Agent, or Firm* — LKGlobal | Lorenz & Kopf, LLP

(57) ABSTRACT

A composite reinforcement structure including a first skin having a first end and a second end and a second skin having a first end and a second end. The first end of the first skin and the first end of the second skin are coupled. A corrugated spar is disposed between the first skin and the second skin and is bonded to the first skin and the second skin.

16 Claims, 13 Drawing Sheets

US 10,843,416 B2
Page 2

Related U.S. Application Data

(60) Provisional application No. 62/159,459, filed on May 11, 2015.

(51) Int. Cl.

| | | |
|---|---|---|
| *B64C 3/26* | (2006.01) | |
| *B29C 70/54* | (2006.01) | |
| *B64C 1/06* | (2006.01) | |
| *B64C 1/14* | (2006.01) | |
| *B64C 7/00* | (2006.01) | |
| *B29D 99/00* | (2010.01) | |
| *B29L 31/30* | (2006.01) | |
| *B29C 43/10* | (2006.01) | |
| *B29K 105/08* | (2006.01) | |

(52) U.S. Cl.
CPC ............ *B29D 99/0028* (2013.01); *B64C 1/06* (2013.01); *B64C 1/14* (2013.01); *B64C 3/26* (2013.01); *B64C 7/00* (2013.01); *B29C 43/10* (2013.01); *B29K 2105/0872* (2013.01); *B29L 2031/30* (2013.01); *B29L 2031/3076* (2013.01); *Y02T 50/43* (2013.01)

(56) References Cited

U.S. PATENT DOCUMENTS

| | | | | |
|---|---|---|---|---|
| 1,930,285 | A * | 10/1933 | Robinson | A63B 49/03 138/143 |
| 2,386,018 | A * | 10/1945 | Watter | B21D 49/00 29/449 |
| 3,002,717 | A * | 10/1961 | Pavlecka | B64C 3/26 244/124 |
| 3,544,417 | A * | 12/1970 | Corzine | E04C 2/243 428/104 |
| 3,910,531 | A * | 10/1975 | Leomand | B64C 1/065 244/119 |
| 4,084,029 | A * | 4/1978 | Johnson | B29D 99/0003 156/210 |
| 4,198,018 | A * | 4/1980 | Brault | B29D 99/0003 244/119 |
| 4,643,933 | A * | 2/1987 | Picken | B32B 3/12 428/116 |
| 4,726,707 | A * | 2/1988 | Newton | E02D 29/14 264/258 |
| 5,152,860 | A * | 10/1992 | Grossman | B29C 33/505 156/161 |
| 5,814,268 | A | 9/1998 | Banchelin | |
| 6,148,586 | A * | 11/2000 | Jandl | E04C 2/22 52/309.7 |
| 6,314,704 | B1 * | 11/2001 | Bryant | E04B 1/12 52/271 |
| 6,622,974 | B1 * | 9/2003 | Dockter | B64C 3/48 244/218 |
| 6,910,661 | B2 * | 6/2005 | Dockter | B64C 3/46 244/218 |
| 7,127,865 | B2 * | 10/2006 | Douglas | E02D 27/02 52/745.13 |
| 7,596,924 | B2 * | 10/2009 | Sakae | B62D 25/06 296/155 |
| 7,802,759 | B2 * | 9/2010 | Ishikawa | B64C 3/48 244/123.12 |
| 8,418,967 | B2 * | 4/2013 | Hemmelgarn | B64C 3/48 244/219 |
| 8,800,953 | B2 | 8/2014 | Morris | |
| 8,834,667 | B2 * | 9/2014 | McCarville | B29C 65/505 156/304.3 |
| 2004/0145080 | A1 * | 7/2004 | Tanaka | B29C 70/443 264/257 |
| 2010/0044912 | A1 | 2/2010 | Torben et al. | |
| 2010/0139850 | A1 | 6/2010 | Morris | |
| 2010/0266415 | A1 * | 10/2010 | Viens | F04D 29/324 416/226 |
| 2011/0127698 | A1 | 6/2011 | Alenby et al. | |
| 2011/0277918 | A1 | 11/2011 | Lee et al. | |
| 2011/0299918 | A1 | 12/2011 | Parker | |
| 2012/0258276 | A1 | 10/2012 | Modin | |
| 2014/0360657 | A1 | 12/2014 | Murai | |
| 2016/0214329 | A1 | 7/2016 | Fernandes | |

FOREIGN PATENT DOCUMENTS

| | | | |
|---|---|---|---|
| DE | 102008056017 A1 | 5/2010 | |
| DE | 102006031336 B4 | 8/2010 | |
| EP | 0199914 A2 * | 11/1986 | ............ B64C 1/061 |
| EP | 2671709 A1 | 12/2013 | |
| EP | 2440395 B1 | 11/2014 | |
| FR | 2567805 A1 | 1/1986 | |
| GB | 1166604 A | 10/1969 | |
| GB | 1513829 | 6/1978 | |
| WO | 9851481 A1 | 11/1998 | |
| WO | 2008003715 A1 | 1/2008 | |
| WO | 2015036940 A1 | 3/2015 | |

OTHER PUBLICATIONS

German Patent and Trademark Office, German Search Report in Application No. DE 10 2016 108 505.7, dated Nov. 18, 2016.
Francisco K. Arakaki, et al. Embraer Composite Material Application, 16th International Conference on Composite Materials.
National Institute of Industrial Property (INPI), Notification of Preliminary Search Report in Application No. FR 1654025, dated Sep. 21, 2018.
Canadian Intellectual Property Office, Official Action for Canadian Patent Application No. 2,926,962 dated Apr. 20, 2018.
The State Intellectual Property Office of the People's Republic of China, First Office Action Issued in Application No. 201610308165. 4, dated Jul. 4, 2018.

* cited by examiner

сomposite reinforcement
COMPOSITE REINFORCEMENT STRUCTURES AND AIRCRAFT ASSEMBLIES COMPRISING COMPOSITE REINFORCEMENT STRUCTURES

CROSS-REFERENCE TO RELATED APPLICATIONS

This application is a continuation-in-part of U.S. application Ser. No. 14/824,290, filed Aug. 12, 2015, which claims the benefit of U.S. Provisional Patent Application 62/159,459 filed May 11, 2015, the entire contents of which are herein incorporated by reference.

TECHNICAL FIELD

The technical field relates generally to reinforcement structures, and more particularly relates to high strength composite reinforcement structures for, for example, an aircraft, a motor vehicle, or the like, comprising a composite corrugated spar.

BACKGROUND

There are many parts for which reinforcement structures are desired. For example, in the commercial and military transportation industries, aircrafts typically include reinforcement structures configured as or as part of fuselages, ailerons, elevators, rudders, winglets, horizontal tails, wings, empennages, and the like; and automotive vehicles typically include reinforcement structures configured as or as part of vehicle body structures, doors, hoods, pillars, roofs, bumpers, and the like.

Reinforcement structures often include an outer skin(s) and one or more internal features, such as ribs, spars, webs, or the like, that are used to help stiffen and strengthen the reinforcement structure. The internal features are attached to the outer skin(s) or other portion(s) of the reinforcement structure using fixing devices such as metal screws, rivets, bolts, and nuts. Consequently, manufacturing reinforcement structures using such fixing mechanisms is quite time consuming and expensive. In addition, the fixing devices, internal features, and/or other portions of the reinforcement structure are typically made of metal, which adds weight to the reinforcement structure and which does not have the highest strength/stiffness to weigh ratio, such as compared to fiber reinforced composite materials.

Accordingly, it is desirable to provide apparatuses and methods for making a reinforcement structure that are time- and cost-efficient to manufacture. Moreover, it is desirable to provide reinforcement structures that are of a relatively high strength and stiffness but are lightweight. Furthermore, other desirable features and characteristics of the various embodiments described herein will become apparent from the subsequent detailed description and the appended claims, taken in conjunction with the accompanying drawings and this background.

BRIEF SUMMARY

Composite reinforcement structures and aircraft assemblies comprising composite reinforcement structures are provided. In accordance with an exemplary embodiment, a composite reinforcement structure including a first skin having a first end and a second end and a second skin having a first end and a second end. The first end of the first skin and the first end of the second skin are coupled. A corrugated spar is disposed between the first skin and the second skin and is bonded to the first skin and the second skin.

In accordance with another exemplary embodiment, a composite reinforcement structure comprises a first skin having a first end and a second end a second skin having a first end and a second end. The first end of the first skin and the first end of the second skin are coupled. A forward skin separates the second end of the first skin and the second end of the second skin. A first wall extends between the first skin and the second skin. A second wall extends between the first skin and the second skin. The second wall is adjacent to and integral with the first wall.

In accordance with a further exemplary embodiment, an aircraft assembly comprises a fixed lifting surface and a composite reinforcement structure. The composite reinforcement structure comprises a first skin having a first end and a second end and a second skin having a first end and a second end. The first end of the first skin and the first end of the second skin are coupled. A corrugated spar is disposed between the first skin and the second skin and is bonded to the first skin and the second skin. A plurality of fittings connects the aircraft reinforcement structure to the fixed lifting surface.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
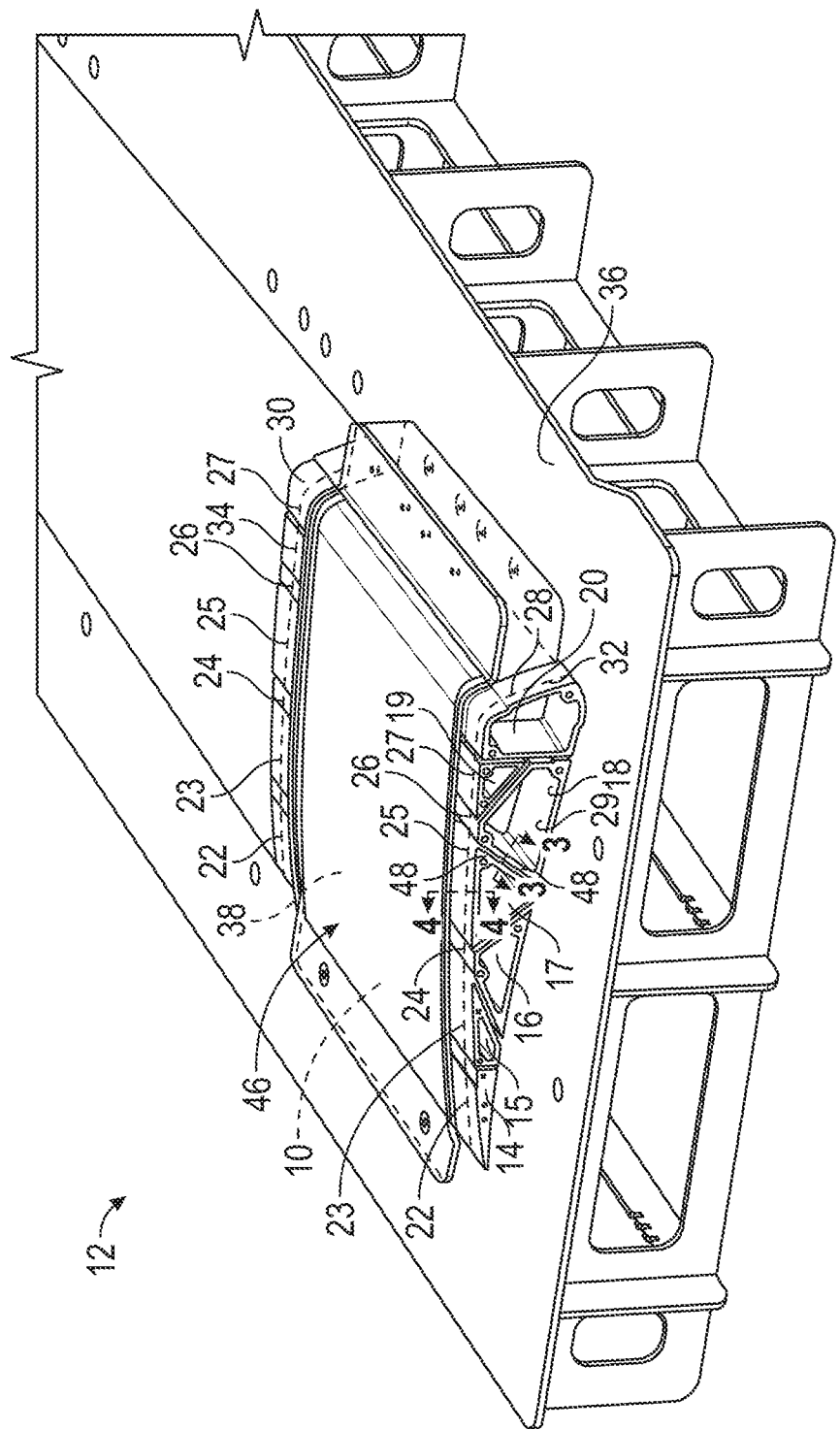
FIGS. 1-2 and 5-8 illustrate, in perspective views, an apparatus and a method for making a reinforcement structure during various intermediate fabrication stages in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses and methods for making reinforcement structures such as for an aircraft, a motor vehicle, or the like. Unlike the prior art, the exemplary embodiments taught herein provide an apparatus that includes a first flexible bladder that at least partially surrounds a first rigid mandrel for supporting a reinforcement structure-forming material during fabrication of a composite reinforcement structure. In an exemplary embodiment, the reinforcement structure-forming material, in an uncured condition, is relatively flexible and formed of a plurality of plies that are arranged together to form a predefined shape (e.g., intended shape for producing the reinforcement structure). Each of the plies includes fabric reinforcement (e.g., reinforcing fibers) and a curable resin that is impregnated into the fabric reinforcement. The reinforcement structure-forming material may be positioned overlying (e.g., on and/or over) the first flexible bladder, for example, by laying up the flexible plies onto the first flexible bladder. During layup, the plies may already include the curable resin (e.g., prepreg plies), or alternatively, the curable resin may be subsequently impregnated into the fabric reinforcement, for example, via an infusion process or the like. As used herein, the term "prepreg ply" refers to a layer of reinforcing fibers pre-impregnated with a resin that is uncured or partially cured (B-staged) but that is not fully cured.

A pressure differential is then produced between inside and outside of the first flexible bladder (e.g., via a vacuum bagging process or the like) such that the first flexible bladder applies a force (e.g., compressive force) to the reinforcement structure-forming material in a direction opposite the first rigid mandrel. Without being limited by theory, in an exemplary embodiment, it is believed that applying the force to the reinforcement structure-forming material while it is flexible and not yet fully cured, helps to compact and/or densify the material for improved mechanical and/or physical properties (e.g., rigidity such as relatively high strength and stiffness) and further, to accurately hold the material to its intended predefined shape (e.g., inner-most layer (IML) and/or outer-most layer (OML) shape) during fabrication of the reinforcement structure. In an exemplary embodiment, while the force is being exerted on the reinforcement structure-forming material, heat is also applied to cure or harden the curable resin, thereby forming a relatively rigid, hardened fiber reinforced composite as the reinforcement structure-forming material in a cured condition.

In an exemplary embodiment, the apparatus includes a plurality of additional flexible bladders correspondingly disposed about additional rigid mandrels that are similarly configured to the first flexible bladder and the first rigid mandrel. The flexible bladders, which are supported by the rigid mandrels, are arranged in a juxtaposed manner with the reinforcement structure-forming material disposed between some or all of the flexible bladders to support the material in the uncured condition in its intended predefined shape for forming the reinforcement structure. As such, when a pressure differential is produced with respect to inside and outside the flexible bladders, the flexible bladders simultaneously apply corresponding forces to compress the reinforcement structure-forming material during curing of the curable resin to form the reinforcement structure as a relatively rigid, hardened fiber reinforced composite structure.

In an exemplary embodiment, the predefined shape of the reinforcement structure-forming material correspondingly results in the composite reinforcement structure having an outer skin(s) and one or more internal features that are integrally bonded to the outer skin(s) via the cured resin of the hardened fiber reinforced composite structure without the use of any fixing devices (e.g., metal fasteners or the like). Additionally, in an exemplary embodiment, because the fiber reinforced composite material is relatively rigid and lightweight compared to metals, the reinforcement structure is relatively rigid and lightweight compared to conventional metal reinforcement structures. Moreover, the internal features form an integral corrugated spar. The corrugated spar of the reinforcement structure is equivalent to a truss rib. Due to its corrugation along the length of structure, the corrugated spar serves as a truss along the length of the reinforcement structure providing maximum strength at minimum weight.

FIGS. 1-8 illustrate a reinforcement structure 10 during various fabrication stages. The described process steps, procedures, and materials are to be considered only as exemplary embodiments designed to illustrate to one of ordinary skill in the art apparatuses and methods for making reinforcement structures; the apparatuses and methods for making reinforcement structures are not limited to these exemplary embodiments. Various steps in the manufacture of reinforcement structures are well known and so, in the interest of brevity, many conventional steps will only be mentioned briefly herein or will be omitted entirely without providing the well-known process details.

Figure 2:
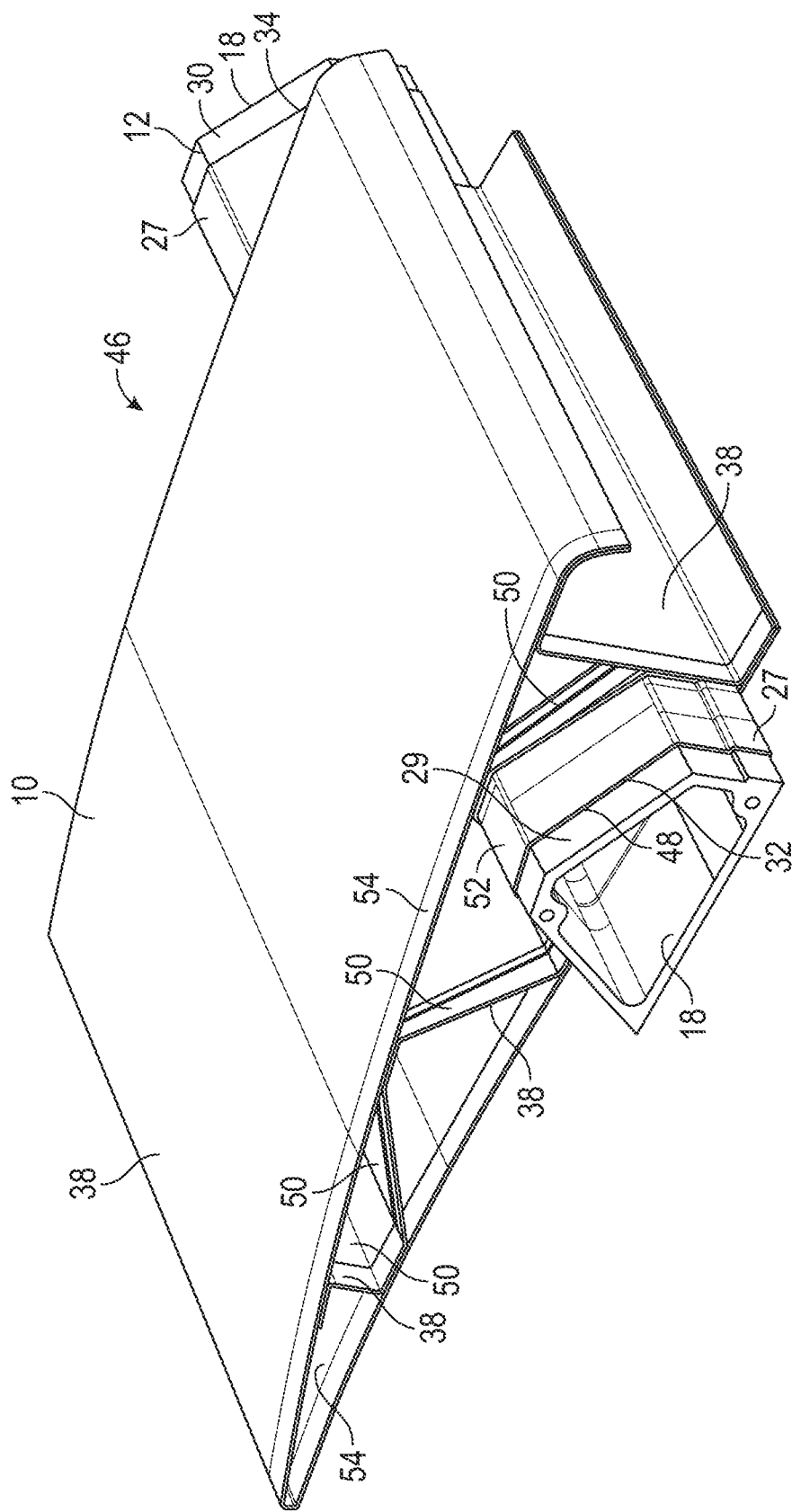

FIG. 1 illustrates, in perspective view, an apparatus 12 for making the reinforcement structure 10 during an intermediate fabrication stage in accordance with an exemplary embodiment. FIG. 2 illustrates, in perspective view, a portion of the apparatus 12 and the reinforcement structure 10 at a further advanced fabrication stage in accordance with an exemplary embodiment. As illustrated in FIGS. 1-2, the apparatus 12 includes a plurality of rigid mandrels 14, 15, 16, 17, 18, 19, and 20 and a plurality of flexible bladders 22, 23, 24, 25, 26, 27, and 28 (illustrated in FIG. 1 by dashed lines). In an exemplary embodiment, the rigid mandrels 14, 15, 16, 17, 18, 19, and 20 are elongated correspondingly extending from proximal end portions 29 to distal end portions 30.

The flexible bladders 22, 23, 24, 25, 26, 27, and 28 may be formed of a relatively flexible material, such as an elastomer, rubber, or the like, for example thermoplastic elastomer (TPE), thermoplastic urethane (TPU), polyvinyl chloride (PVC), thermoplastic olefin (TPO), or the like. The rigid mandrels 14, 15, 16, 17, 18, 19, and 20 may be formed of a relatively rigid material, such as metal, for example extruded aluminum or the like.

The flexible bladders 22, 23, 24, 25, 26, 27, and 28 correspondingly surround at least a portion of the rigid mandrels 14, 15, 16, 17, 18, 19, and 20 (e.g., more clearly illustrated in FIG. 2 with respect to flexible bladder 27 and rigid mandrel 18). In particular, in an exemplary embodiment, the flexible bladders 22, 23, 24, 25, 26, 27, and 28 surround and cover intermediate portions of the corresponding rigid mandrels 14, 15, 16, 17, 18, 19, and 20 that extend between the proximal end portions 29 to the distal end portions 30 such that the intermediate portions of the rigid mandrels 14, 15, 16, 17, 18, 19, and 20 are disposed inside the flexible bladders 22, 23, 24, 25, 26, 27, and 28. As such, each of the flexible bladders 22, 23, 24, 25, 26, 27, and 28 is at least partially supported by the intermediate portion of a corresponding one of the rigid mandrels 14, 15, 16, 17, 18, 19, and 20. In an exemplary embodiment, the flexible bladders 22, 23, 24, 25, 26, 27, and 28 have open ends 32 and 34 and the rigid mandrels 14, 15, 16, 17, 18, 19, and 20 extend from inside the flexible bladders 22, 23, 24, 25, 26, 27, and 28 through the open ends 32 and 34 to outside the flexible bladders 22, 23, 24, 25, 26, 27, and 28 such that the proximal and distal end portions 29 and 30 of the rigid mandrels 14, 15, 16, 17, 18, 19, and 20 are exposed.

Figure 3:
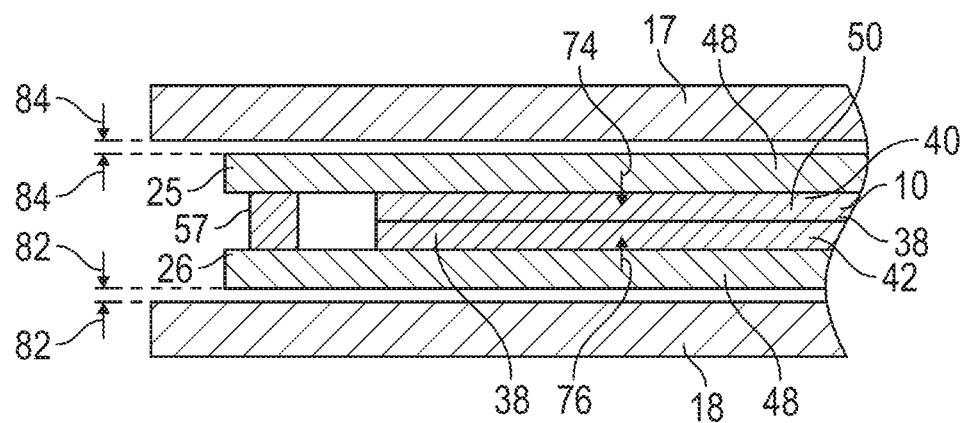
FIG. 3 is a sectional view of the apparatus depicted in FIG. 1 along line 3-3.
Figure 4:
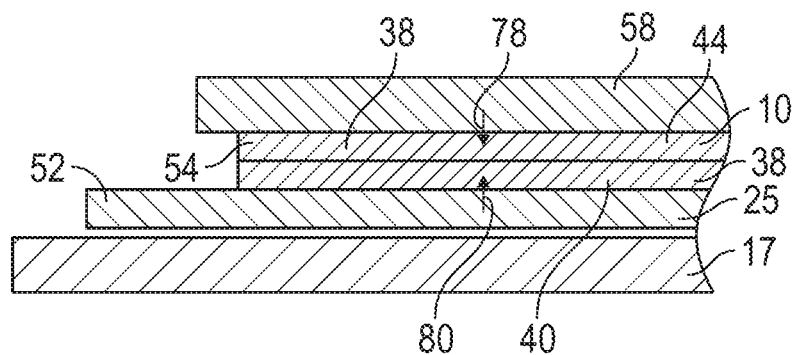
FIG. 4 is a sectional view of the apparatus depicted in FIG. 1 along line 4-4.

In an exemplary embodiment, the apparatus 12 includes a base table 36 on which the flexible bladders 22, 23, 24, 25, 26, 27, and 28 in combination with the rigid mandrels 14, 15, 16, 17, 18, 19, and 20 are arranged in a juxtaposed manner to define a predefined shape 46 for producing the reinforcement structure 10. Referring also to FIGS. 3-4, the reinforcement structure 10 is formed of a reinforcement structure-forming material 38 that is supported by the flexible bladders 22, 23, 24, 25, 26, 27, and 28. In an exemplary embodiment, the rigid mandrels 14, 15, 16, 17, 18, 19, and 20 provide rigid or solid support to the flexible bladders 22, 23, 24, 25, 26, 27, and 28 so that the flexible bladders 22, 23, 24, 25, 26, 27, and 28 can support the reinforcement structure-forming material 38 in or near the predefined shape 46 during fabrication of the reinforcement structure 10.

In particular and as will be discussed in further detail below, in an exemplary embodiment, the reinforcement structure-forming material 38 is formed of a plurality of plies 40, 42, and 44 that are arranged together (e.g., stack or layup) to form the predefined shape 46. Each of the plies 40, 42, and 44 includes fabric reinforcement and a resin that is impregnated into the fabric reinforcement. Exemplary fabric reinforcements may include unidirectional fibers, cloth or woven fibers, nonwoven fibers, random fibers, braided fibers, continuous fibers, and/or discontinuous fibers. Non-limiting examples of reinforcing fibers include S-glass fibers, E-glass fibers, carbon fibers, ceramic fibers, metallic fibers, polymeric fibers, and the like. Non-limiting examples of resins include polymeric resins or precursors of polymeric resins, such as, for example, epoxies, polyurethanes and/or polyurethane precursors, polyesters and/or polyester precursors, and the like. Other reinforcing fibers and/or resins known to those skilled in the art of fiber reinforced composite materials may also be used.

When the resin is in an uncured condition (e.g., curable or uncured resin) as illustrated in FIG. 1, the reinforcement structure-forming material 38 is flexible and the flexible bladders, which are supported by the rigid mandrels, provide a stable or solid continuous support to hold the reinforcement structure-forming material 38 in or close to its intended predefined shape 46. As will be discussed in further detail below, when the resin is in a cured condition (e.g., cured resin) as illustrated in FIG. 2, the reinforcement structure-forming material 38 is a relatively rigid fiber reinforced composite in which the reinforcement structure 10 is configured in the predefined shape 46 as a rigid reinforced composite structure.

As illustrated, a portion of the plies 40 and 42 are positioned along generally vertical walls 48 of at least some of the flexible bladders 22, 23, 24, 25, 26, 27, and 28 and their corresponding rigid mandrels 14, 15, 16, 17, 18, 19, and 20 so that the predefined shape 46 for the reinforcement structure 10 includes internal features 50, such as ribs, spars, webs, or the like. In an exemplary embodiment, the generally vertical walls 48 include elongated and relatively flat sections to facilitate forming the internal features 50 as ribs, spars, webs, or the like having corresponding relatively elongated, flat sections. Likewise, a portion of the plies 40 and 44 are positioned along generally horizontal walls 52 of at least some of the flexible bladders 22, 23, 24, 25, 26, 27, and 28 and corresponding rigid mandrels 14, 15, 16, 17, 18, 19, and 20 so that the predefined shape 46 for the reinforcement structure 10 includes outer skins 54. As illustrated, the internal features 50 are coupled to and extend between the outer skins 54. In an exemplary embodiment, when the reinforcement structure-forming material 38 is in the cured condition as illustrated in FIG. 2, the internal features 50 are affixed to the outer skins 54 via the cured resin without the use of any fixing devices.

Figure 5:
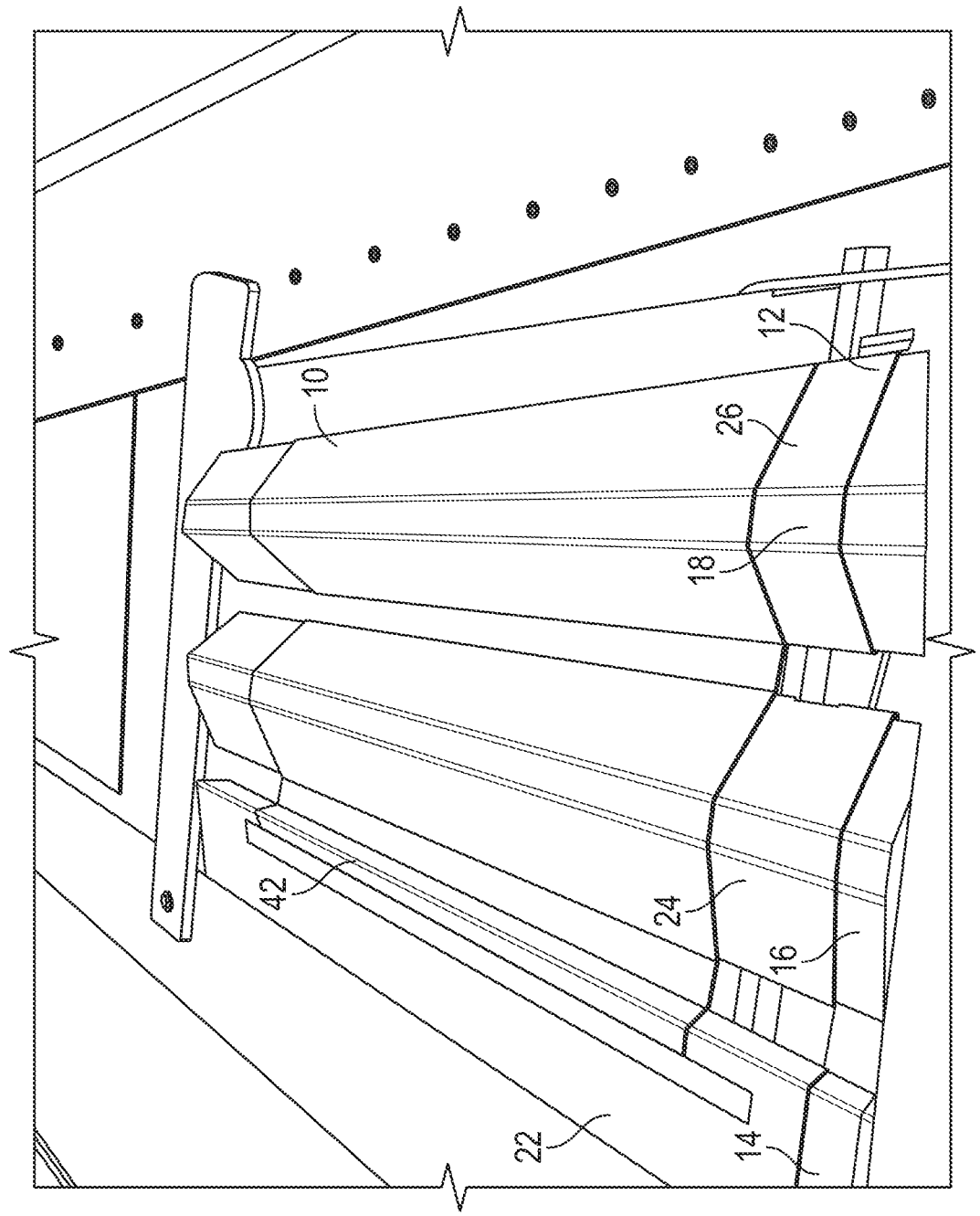

Referring to FIG. 5 with continuing reference to FIGS. 1-4, in an exemplary embodiment, the reinforcement structure 10 illustrated in FIG. 2 may be formed by arranging in a juxtaposed manner a first row of the flexible bladders 22, 24, and 26 with the corresponding rigid mandrels 14, 16, and 18 disposed inside the flexible bladders 22, 24, and 26 on the base table 36. A layup of one or more of the plies 42 is then arranged over and/or under the first row of the flexible bladders 22, 24, and 26.

Figure 6:
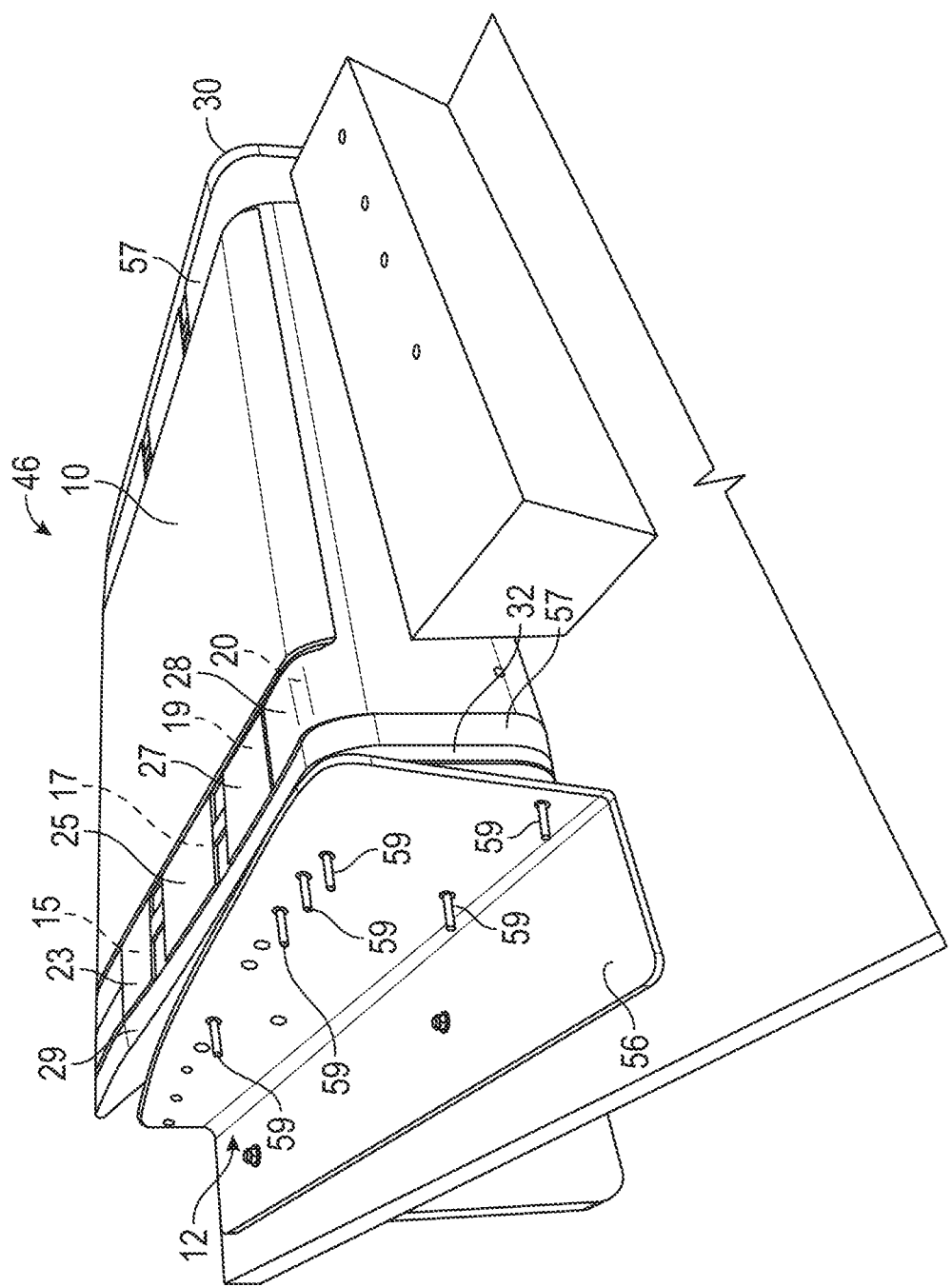

Next, the process continues as illustrated in FIG. 6 with continuing reference to FIGS. 1-5 by arranging in a juxtaposed manner a second row of the flexible bladders 23, 25, 27, and 28 with the corresponding rigid mandrels 15, 17, 19, and 20 disposed inside the flexible bladders 23, 25, 27, and 29 adjacent to (e.g., next to and/or overlying) the first row of the flexible bladders 22, 24, and 26. A layup of one or more plies 40 and/or 44 is then arranged over and/or around the second row of the flexible bladders 23, 25, 27, and 29. In an exemplary embodiment, the plies 40, 42, and 44 are prepreg plies that include the fabric reinforcement with the curable resin. In an alternative embodiment, the plies 40, 42, and 44 are formed of the fabric reinforcement and the curable resin is incorporated into the fabric reinforcement via a secondary process such as an infusion process, for example, a resin transfer process or the like.

As illustrated in FIG. 6, a positioning plate 56 may be arranged adjacent to the proximal and/or distal end portions 29 and 30 of the rigid mandrels 14, 15, 16, 17, 18, 19, and 20 to facilitate positioning the rigid mandrels 14, 15, 16, 17, 18, 19, and 20 and the flexible bladders 22, 23, 24, 25, 26, 27, and 28 to support the reinforcement structure-forming material 38 in the predefined shape 46. In an exemplary embodiment, locator pins 59 are coupled to the positioning plate(s) 56 and the rigid mandrels 14, 15, 16, 17, 18, 19, and 20 to facilitate maintaining the flexible bladders 22, 23, 24, 25, 26, 27, and 28 in position during fabrication of the reinforcement structure 10.

In an exemplary embodiment, tacky tape 57 is applied along the outer surfaces of the flexible bladders 22, 23, 24, 25, 26, 27, and 28 just inboard of the open ends 32 and 34 during and/or after laying up the plies 40, 42, and 44. As will be discussed in further detail below, the tacky tape 57 is used to form a seal around the outer surfaces of the flexible bladders 22, 23, 24, 25, 26, 27, and 28 to facilitate producing a pressure differential between inside and outside of the flexible bladders 22, 23, 24, 25, 26, 27, and 28.

Figure 7:
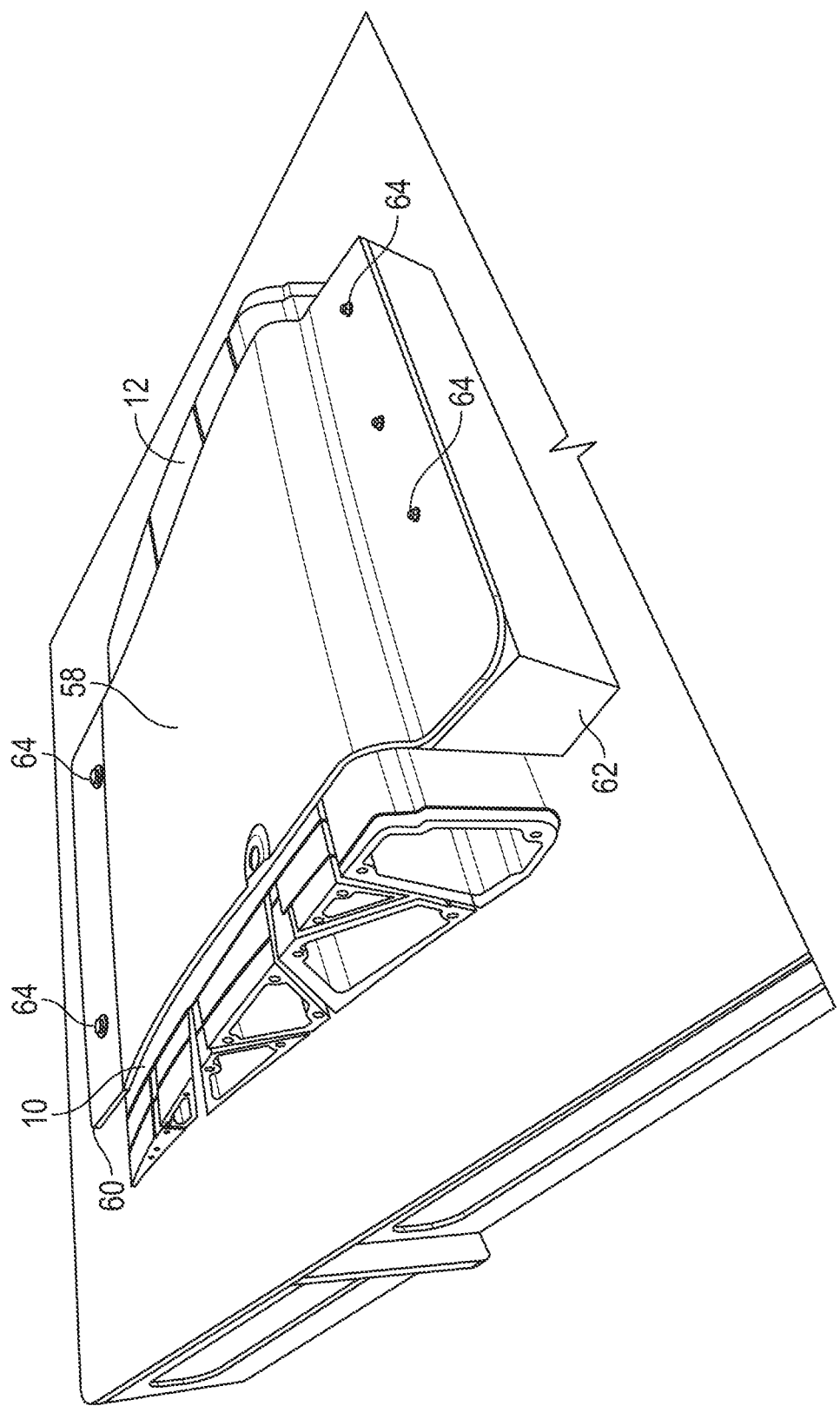

In an exemplary embodiment, the process continues as illustrated in FIGS. 6-7 with continuing reference to FIGS. 1-4 by positioning an outer surface plate 58 overlying the plies 40, 42, and 44, the flexible bladders 22, 23, 24, 25, 26, 27, and 28, and the rigid mandrels 14, 15, 16, 17, 18, 19, and 20 to define an outer surface profile for the predefined shape 46 corresponding to the outer skin 54 (see FIG. 2). As illustrated, the outer surface plate 58 is attached to positioning blocks 60 and 62 via threaded fasteners 64 to help hold the outer surface plate 58 in position during fabrication of the reinforcement structure 10.

Figure 8:
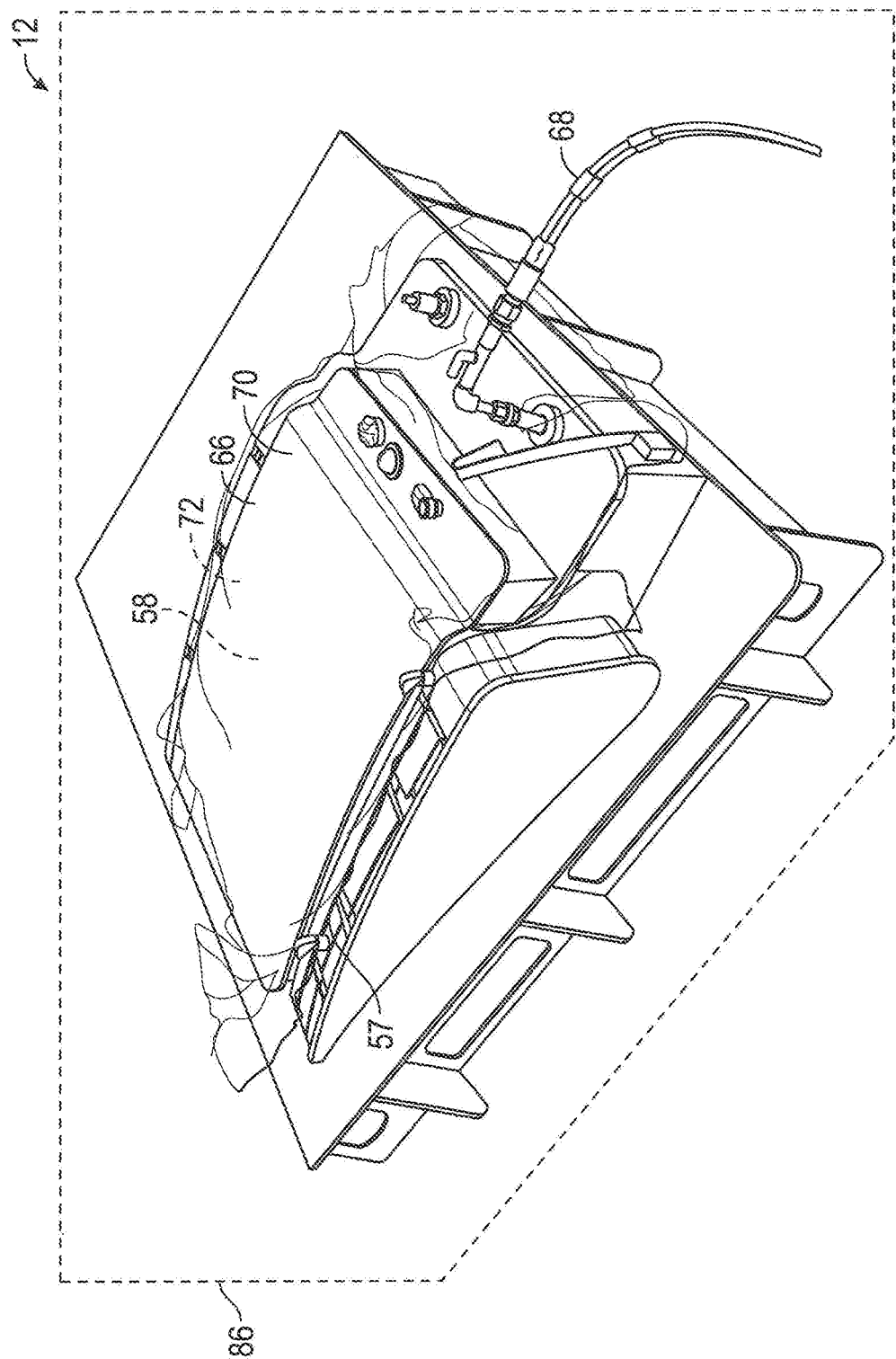

Referring to FIG. 8 with continuing reference to FIGS. 1-4 and 7, in an exemplary embodiment, the apparatus 12 includes a vacuum bag arrangement 66 that sealingly interfaces with the flexible bladders 22, 23, 24, 25, 26, 27, and 28 for producing a pressure differential between inside and outside the flexible bladders 22, 23, 24, 25, 26, 27, and 28. As illustrated, the vacuum bag arrangement 66 is arranged over the outer surface plate 58, the plies 40, 42, and 44, the flexible bladders 22, 23, 24, 25, 26, 27, and 28, and the rigid mandrels 14, 15, 16, 17, 18, 19, and 20. In an exemplary embodiment, the vacuum bag arrangement 66 includes a vacuum source 68, a vacuum bagging film 70, a breather fabric 72, and the tacky tape 57 (see also FIG. 6) as discussed above. In an exemplary embodiment, the vacuum bagging film 70 covers the breather fabric 72 and the tacky tape 57 forms a seal between the vacuum bagging film 70 and the outside surfaces of the flexible bladders 22, 23, 24, 25, 26, 27, and 28. The vacuum source 68 is operatively coupled to the vacuum bagging film 70 and is in fluid communication with the volume formed between the vacuum bagging film 70 and the outside surfaces of the flexible bladders 22, 23, 24, 25, 26, 27, and 28. The breather fabric 72 allows the vacuum source 68 to evacuate air from this volume without the vacuum bagging film 70 obstructing airflow to produce a vacuum condition immediately outside of the flexible bladders 22, 23, 24, 25, 26, 27, and 28 when the vacuum source 68 applies a vacuum. As discussed above, the open ends 32 and 34 of the flexible bladders are effectively sealed off from the vacuum bag arrangement 66 such that the insides of the flexible bladders 22, 23, 24, 25, 26, 27, and 28 are fluidly decoupled from the vacuum source 68. As such, when the vacuum source 68 applies a vacuum to the vacuum bag arrangement 66, a pressure differential between inside and outside the flexible bladders is produced by at least about the difference in pressure between the vacuum (e.g., about 0 to about 0.1 atm) from the vacuum source 68 and the ambient pressure outside of the vacuum bag arrangement 66 (e.g., about 1 atm at STP conditions).

As illustrated in FIGS. 3-4 and with continuing reference to FIGS. 1-2 and 8, in an exemplary embodiment, in response to the pressure differential between inside and outside of the flexible bladders 22, 23, 24, 25, 26, 27, and 28, the flexible bladders 22, 23, 24, 25, 26, 27, 28 advance from a nominal condition to a pressurized condition. In the pressurized condition, forces are applied to the reinforcement structure-forming material 38 commensurate with the pressure differential in corresponding directions (indicated by arrows 74, 76, 78, and 80) that are opposite the corresponding adjacent portions of the rigid mandrels 14, 15, 16, 17, 18, 19, and 20. In an exemplary embodiment, diametrically opposed forces 74, 76 and 78, 80 compress the reinforcement structure-forming material 38 to compact and/or densify the material 38 for improved mechanical and/or physical properties (e.g., rigidity) and further, to accurately hold the material 38 to its intended predefined shape 46 to facilitate forming the internal features 50 and the outer skins 54.

In an exemplary embodiment, the flexible bladders 22, 23, 24, 25, 26, 27, and 28 in the nominal condition are sized nearly "net fit" to their corresponding rigid mandrels 14, 15, 16, 17, 18, 19, and 20 and only minimally inflate when advanced to the pressurized condition. As such, the outer surfaces of the flexible bladders 22, 23, 24, 25, 26, 27, and 28 are substantially spatially registered with the outer surfaces of the rigid mandrels 14, 15, 16, 17, 18, 19, and 20 in both the nominal and pressurized conditions. In an exemplary embodiment, the inner surfaces of the flexible bladders 22, 23, 24, 25, 26, 27, and 28 are spaced apart from the outer surfaces of their corresponding rigid mandrels 14, 15, 16, 17, 18, 19, and 20 a distance (indicated by arrows 82 and 84) of from about 0 to about 2 mm when in the nominal condition and of from about 0.001 to about 5 mm in the pressurized condition.

As illustrated in FIG. 8 and with continuing reference to FIGS. 1-2, the apparatus 12 may include a heating and/or pressurizing device 86. In an exemplary embodiment, the heating and/or pressurizing device 86 is an autoclave. In another embodiment, the heating and/or pressurizing device 86 is a heating device, such as, for example, an oven. In an exemplary embodiment, the heating and/or pressurizing device 86 provides heat to the reinforcement structure-forming material 38 while the flexible bladders 22, 23, 24, 25, 26, 27, and 28 are in the pressurized condition to cure or harden the curable resin to form the reinforcement structure 10 as illustrated in FIG. 2 as a relatively rigid, hardened fiber reinforced composite structure. Additionally, the heating and/or pressurizing device 86 can provide additional pressure to inside the flexible bladders 22, 23, 24, 25, 26, 27, and 28 to further increase the pressure differential between inside and outside of the flexible bladders 22, 23, 24, 25, 26, 27, and 28 to increase the applied force(s) to the reinforcement structure-forming material 38 during curing. In an exemplary embodiment, the heating and/or pressurizing device 86 heats the reinforcement structure-forming material 38 to a temperature of from about 50 to about 250° C. and pressurizes the inside of the flexible bladders 22, 23, 24, 25, 26, 27, and 28 to a pressure of from about 1.5 to about 10 atm.

Figure 9:
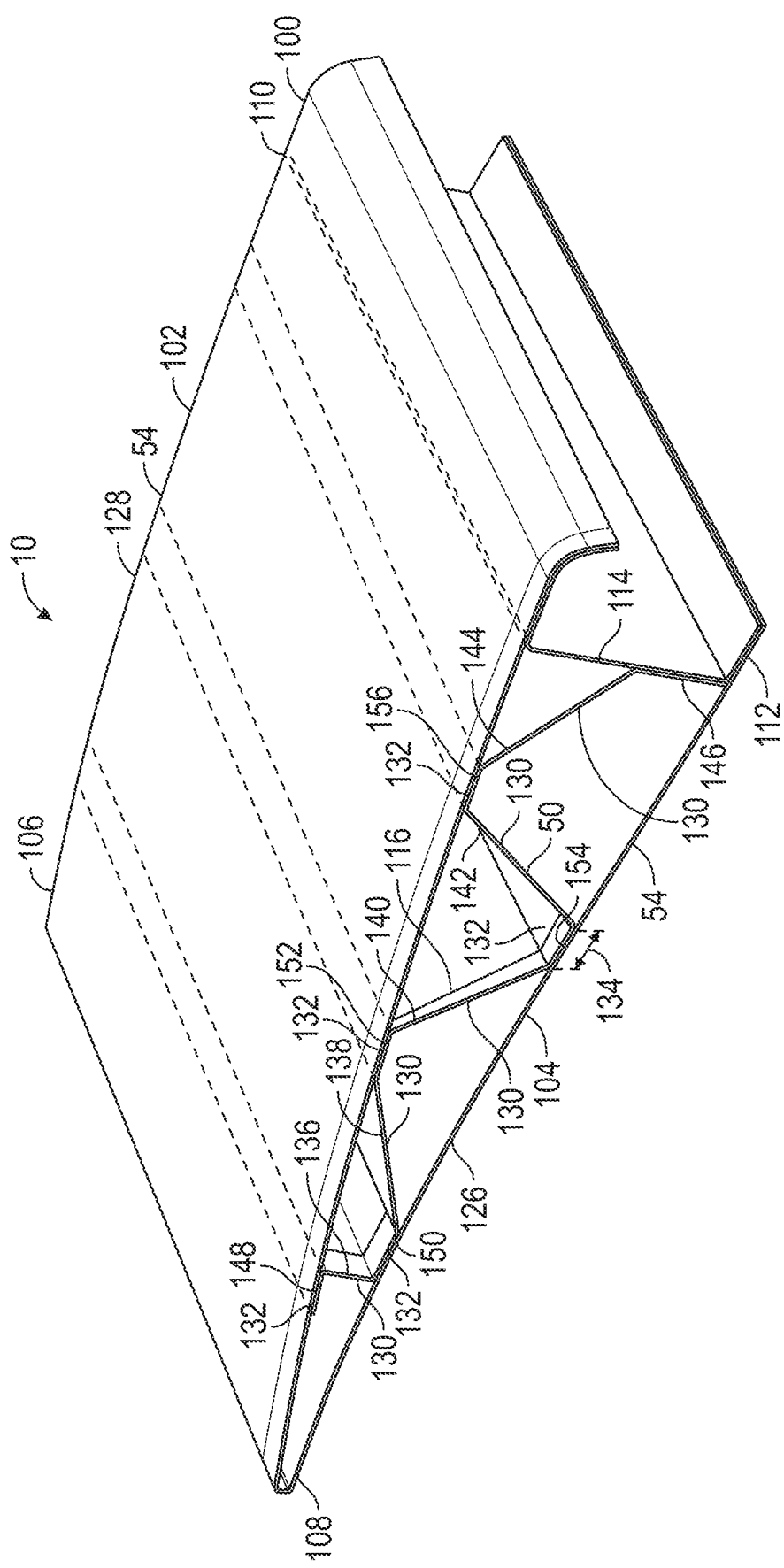
FIG. 9 is a perspective view of a reinforcement structure in accordance with an exemplary embodiment.
Figure 10:
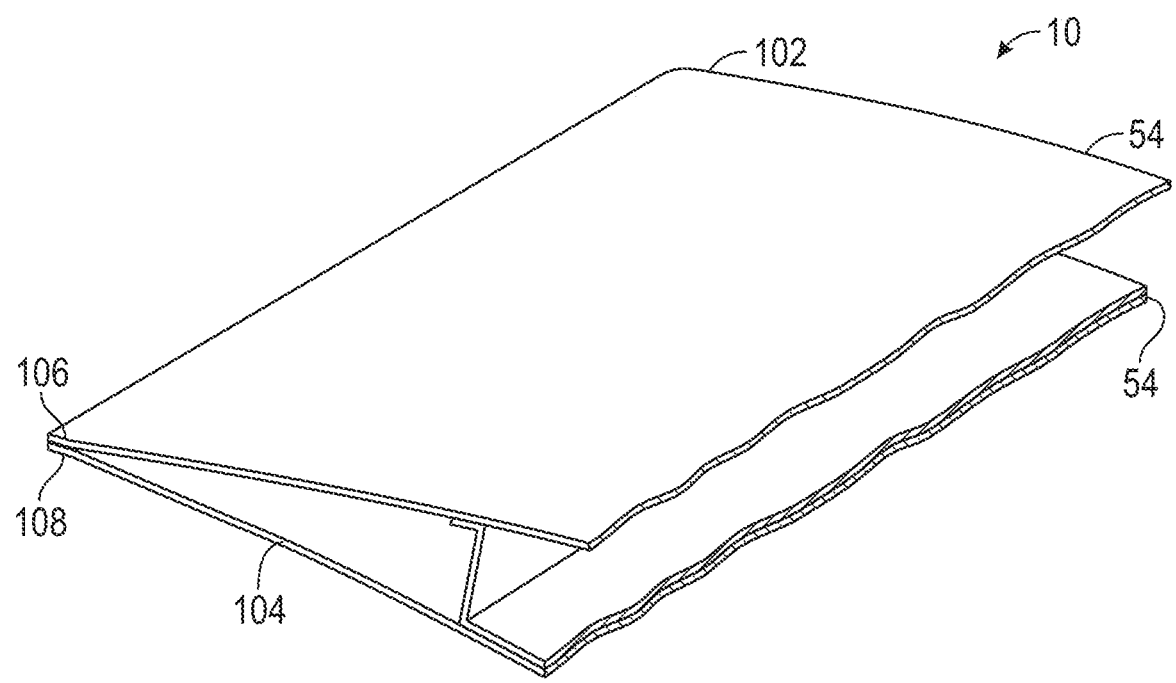
FIG. 10 is a perspective view of an end of a reinforcement structure in accordance with another exemplary embodiment.

In an exemplary embodiment, upon curing of the reinforcement structure-forming material 38, the internal features 50 and the outer skins 54 are bonded together to achieve reinforcement structure 10, as illustrated in FIG. 9. The outer skins 54 of the reinforcement structure 10 include a first skin 102 having a first end 106 and a second end 110 and a second skin 104 having a first end 108 and a second end 112 with the first ends 106 and 108 coupled together. In one embodiment, first skin 102 and second skin 104 are formed from one whole skin 100 that is folded back upon itself to form first skin 102 and second skin 104 such that first end 106 of first skin 102 and first end 108 of second skin 104 are integral with each other. As used herein, the term "integral" means consisting or composed of parts that together constitute a whole and excludes connected by fasteners, such as screws, nails, adhesives, or other external fixing devices. In another exemplary embodiment, as illustrated in FIG. 10, first skin 102 and second skin 104 are discrete skins. In this regard, first end 106 of first skin 102 and first end 108 of second skin 104 are bonded to each other during the heating and/or pressurization process described above with reference to FIG. 8. As used herein, the term "bonded" means attached by a chemical process, for example, by co-curing together.

Referring again to FIG. 9, in an exemplary embodiment, a forward skin 114 is bonded to first skin 102 and second skin 104 and separates second end 110 of first skin 102 from second end 112 of second skin 104. In this regard, reinforcement structure 10 has a substantially triangular cross-sectional shape.

Figure 11:
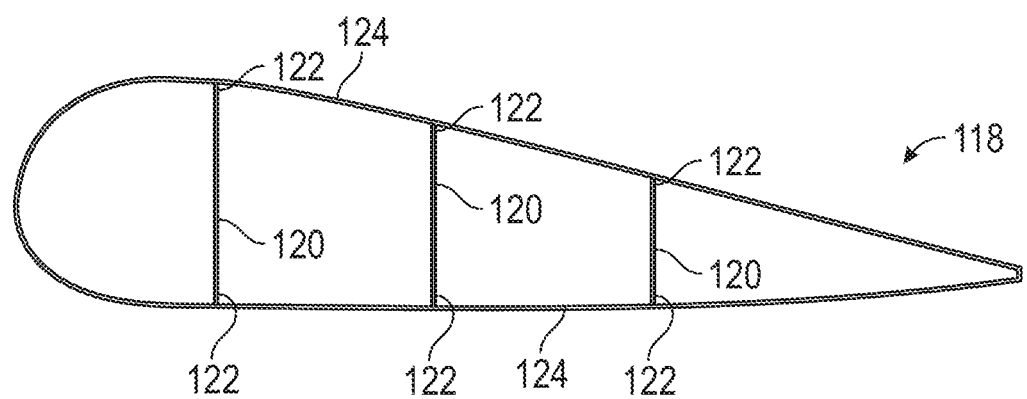
FIG. 11 is a cross-sectional view of a reinforcement structure of the prior art.

In an exemplary embodiment, as illustrated in FIG. 9, the internal features 50, once cured as described above, are configured as a corrugated spar 116 disposed between the first skin 102, the second skin 104, and the forward skin 114. In an embodiment, the corrugated spar 116 is bonded to the first skin 102 and the second skin 104. In another embodiment, the corrugated spar 116 also is bonded to the forward skin 114. As used herein, the term "corrugated spar" means one unitary piece configured into folds or alternate furrows or ridges formed of adjacent, integral walls. The reinforcement structure 10 with corrugated spar 116 is in contrast to prior art reinforced structures, such as rudder 118 illustrated in FIG. 11, which use discrete walls 120 that are bonded or otherwise affixed at their ends 122 to the outer skins 124 of the reinforced structure. The discrete walls 120 of such prior art reinforced structures are susceptible to dislocation from the skins 124 upon impact, thus demonstrating reduced impact resistance compared to the corrugated spar 116 of the reinforcement structure 10. The corrugated spar 116 of the reinforcement structure 10 is equivalent to a truss rib. The corrugated spar 116 is continuous along the length of the structure, that is, referring to FIG. 9, from side 126 to side 128 and, due to its corrugation along the length of structure, serves as a truss along the length of the reinforcement structure 10 providing maximum strength at minimum weight. The exemplary embodiment of reinforcement structure 10 illustrated in FIG. 9 includes forward skin 114, corrugated spar 116 and integral first skin 102 and second skin 104. In this regard, reinforcement structure 10 comprises only three laminates such that the structure provides increased strength at decreased weight compared to similar prior art structures.

As noted above, the corrugated spar 116 has a plurality of adjacent integral walls 130. In an exemplary embodiment, two adjacent walls 130 are integral with each other via a spar cap 132. Each spar cap 132 is a flattened portion of the corrugated spar 116 that is bonded to either the first skin 102 or the second skin 104. As a spar cap 132 is integral with its adjacent wall(s) 130, it serves not only to anchor the walls 130 of the corrugated spar 116 to the outer skin but also, because of the flattened area of bonding, provides greater impact resistance than the discrete walls described above with respect to FIG. 11. In another exemplary embodiment, while the reinforcement structure 10 is designed and manufactured to eliminate the need for fixing devices, the spar cap 132 provides an area for mechanical attachment if needed, such as, for reinforcement and/or repair. For example, the spar cap 132 can have a width 134 that is sufficiently wide to host a fixing device, such as a screw, rivet, bolt or nut. In one example, the spar cap 132 has a width 134 in the range of about 1.27 centimeters (cm) (0.5 inches) to about 5.08 cm (2 inches), such as, for example, 2.54 cm (1 inch).

Figure 12:
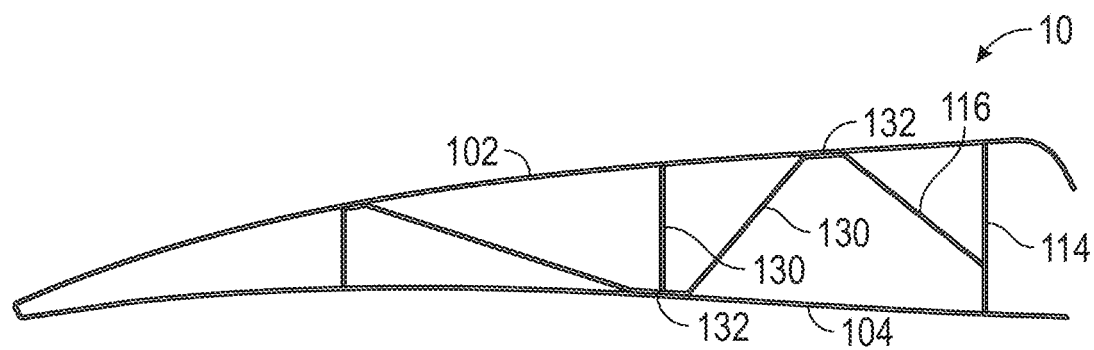
FIGS. 12-14 are cross-sectional views of various configurations of corrugated spars of reinforcement structures in accordance with exemplary embodiments.
Figure 13:
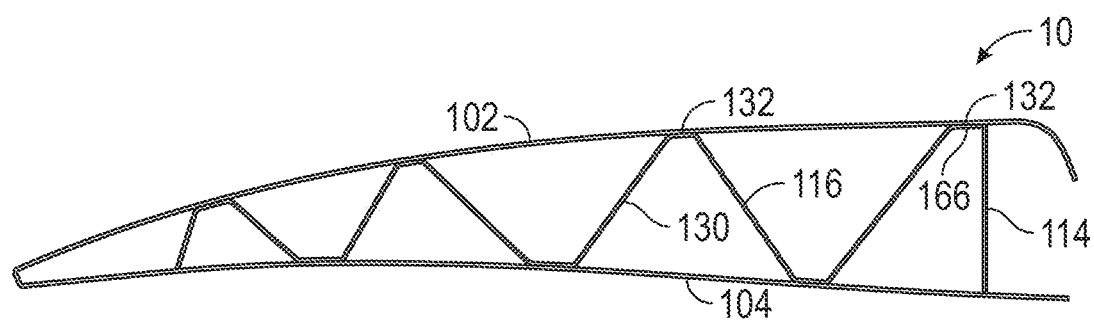
Figure 14:
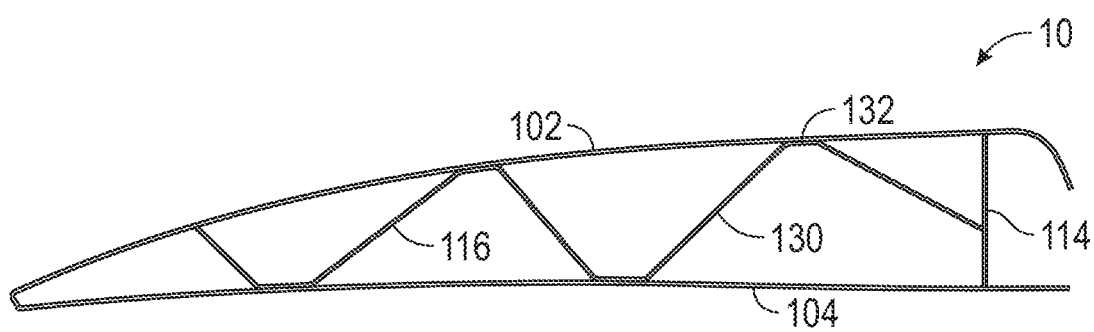

The walls 130 of the corrugated spar 116 can be positioned between first skin 102, second skin 104, and forward skin 114 in any configuration suitable for a particular reinforcement structure application. In one exemplary embodiment, the walls 130 are disposed so as to provide maximum strength at minimum weight. While the corrugated spar 116 of FIG. 9 is illustrated with six walls 136, 138, 140, 142, 144, and 146, and five spar caps 148, 150, 152, 154, and 156, the corrugated spar 116 of the reinforcement structure 10 is not so limited and can have any suitable number of walls 130 and spar caps 132. Exemplary alternative embodiments of reinforcement structure 10 with various configurations of corrugated spar 116 are illustrated in FIGS. 12-14.

Figure 15:
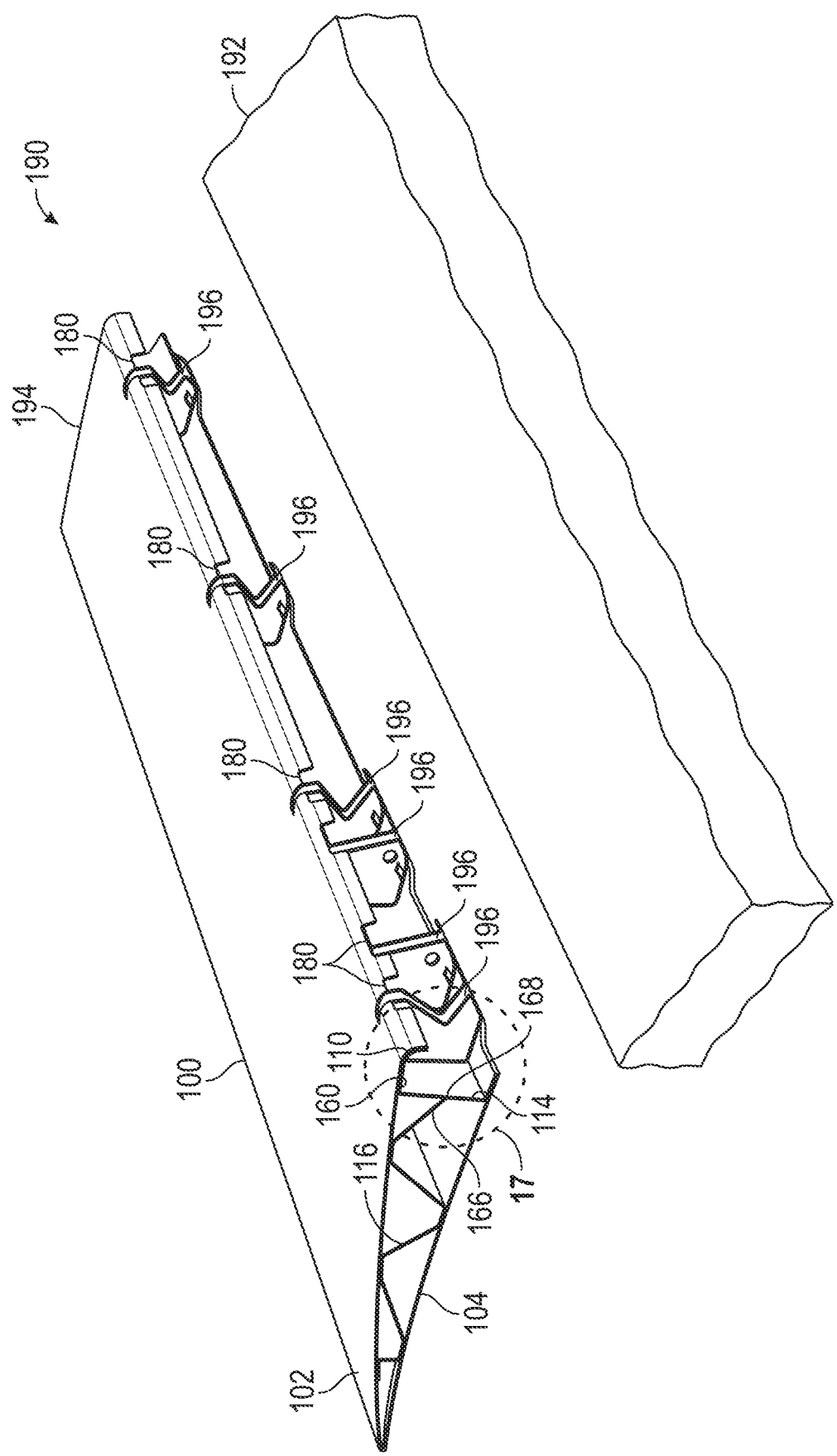
FIG. 15 is a perspective view of an aircraft assembly in accordance with an exemplary embodiment.

FIG. 15 illustrates an aircraft assembly 190 in accordance with an exemplary embodiment. The aircraft assembly 190 includes a fixed lifting surface 192. The fixed lifting surface 192 can be any surface of an aircraft used to lift the aircraft into the air. For example, the fixed lifting surface 192 can be a wing, a tail, or a canard of an airplane. The aircraft assembly also comprises a reinforcement structure 194. The reinforcement structure 194 can be, for example, an aileron, an elevator, a rudder, a flap, a spoiler, a winglet, a fixed trailing edge, or the like, for an aircraft. Reinforcement structure 194 can be any of the exemplary embodiments of reinforcement structure 10 and can be formed of any of the reinforcement structure-forming materials 38 discussed above. For ease of illustration, reinforcement structure 194 is shown in FIG. 15 as an aileron with first skin 102, second skin 104, and forward skin 114 and fixed lifting surface 192 is shown as a portion of an aircraft wing. Also for illustration purposes, the fixed lifting surface 192 is shown detached from the reinforcement structure 194 so that fittings 196, discussed in more detail below, can be more clearly viewed.

Figure 16:
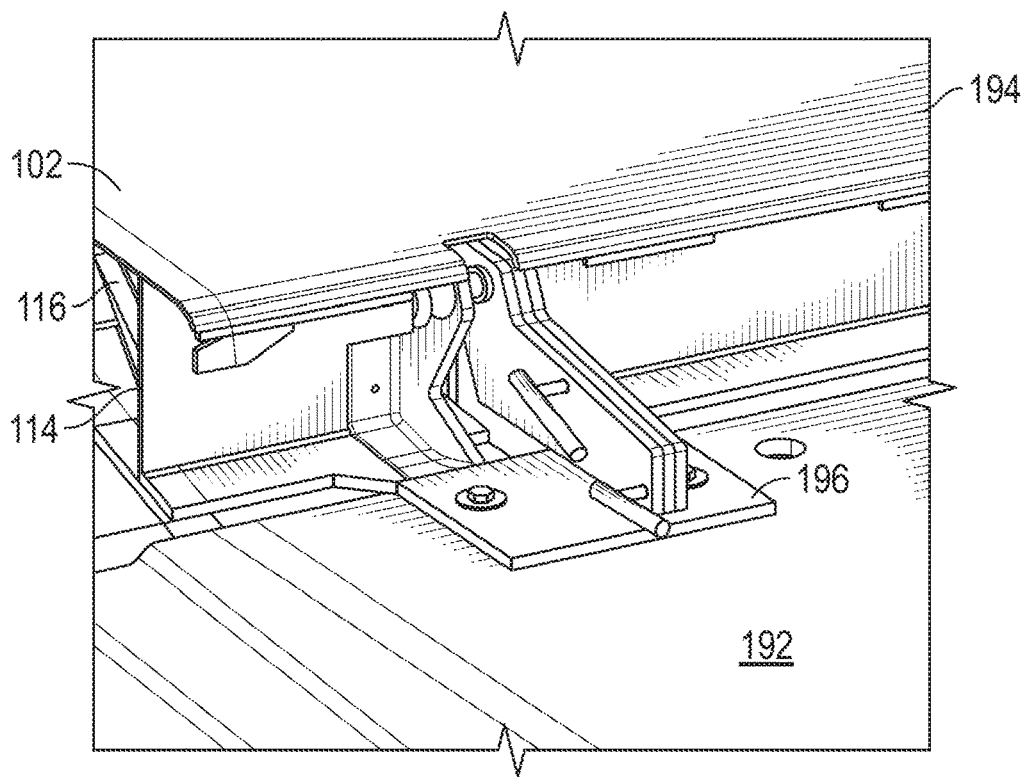
FIG. 16 is a close-up perspective view of a fitting connecting a reinforcement structure to a fixed lifting surface of an aircraft assembly in accordance with an exemplary embodiment.

Aircraft assembly 190 further includes fittings 196 that connect reinforcement structure 194 to fixed lifting surface 192. In an embodiment, the fittings 196 are hinges that permit the reinforcement structure 194 to passively rotate about fixed lifting surface 192. In another embodiment, fittings 196 are actuator fittings that electronically, mechanically, or hydraulically move reinforcement structure 194 about fixed lifting surface 192. Fittings 196 also can be of any other suitable configuration that connects reinforcement structure 194 to fixed lifting surface 192. FIG. 16 is a close-up view of an exemplary fitting 196 connecting a reinforcement structure 194 to a fixed lifting surface 192.

Figure 17:
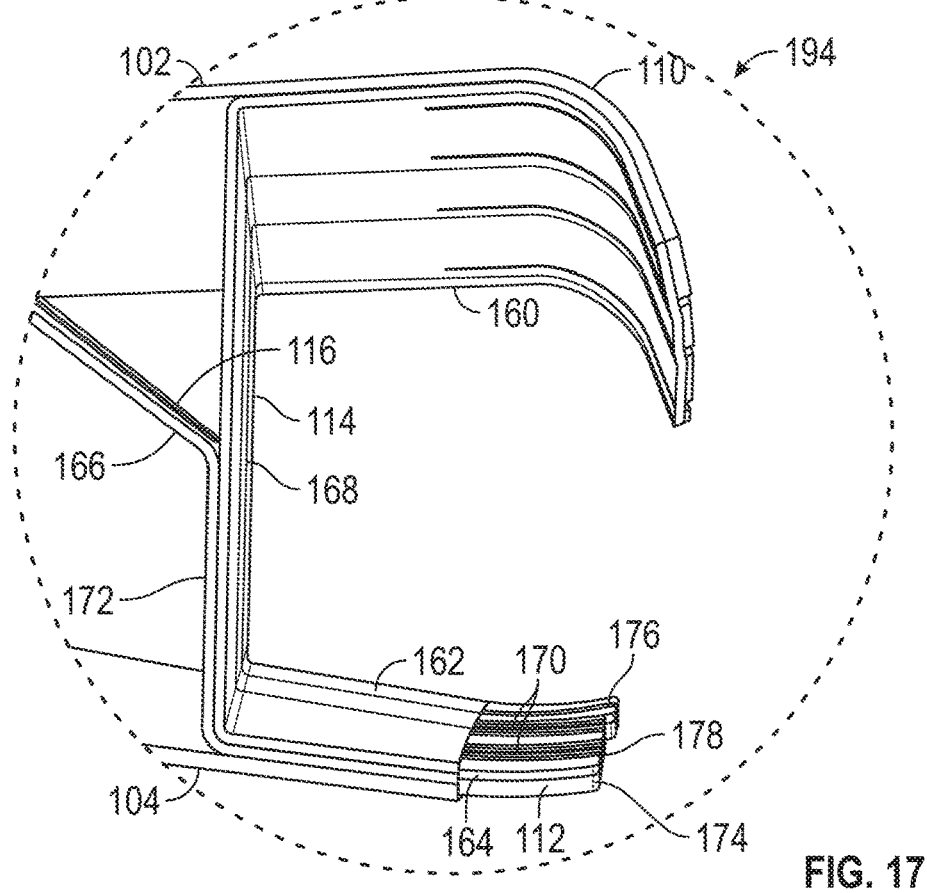
FIG. 17 is a close-up side view of the forward skin of the reinforcement structure of FIG. 15.

FIG. 17 is a close-up side view of the forward skin 114 of the reinforcement structure 194 of FIG. 15. Forward skin 114 has a first end 160, a second end 162, and a wall 168 disposed between first end 160 and second end 162. The second end 110 of first skin 102 is bonded to first end 160 of forward skin 114, which together bend or curve for attachment of certain fittings, for example, hinges as described above. In an exemplary embodiment, as illustrated in FIGS. 15 and 17, a wall 166 of corrugated spar 116 extends from first skin 102 to wall 168 of forward skin 114 and is integral with wall 172 of corrugated spar 116. In one exemplary embodiment, wall 172 is bonded to at least a portion of wall 168 of forward skin 114 and is bonded to and sandwiched between second end 162 of forward skin 114 and second end 112 of second skin 104. Cutouts 170 for receiving fittings 196 extend through an edge 174 of second end 112 of second skin 104, an edge 178 of wall 172 of corrugated spar 116, and an edge 176 of second end 162 of forward skin 114. By extending wall 172 of corrugated spar 116 to the end of the cutouts 170, that is, to the edge 176 of second end 162 of forward skin 114, as illustrated in FIG. 17, load transfer to the forward skin 114 is avoided. In addition, no step-downs of the plies of the wall 172 of the corrugated spar 116 in the cutouts 170 are present to result in uneven tolerance in the cutouts 170. Even tolerance in the cutouts 170 ensures robust anchoring of the fittings 196 to the reinforcement structure 194. Referring momentarily to FIG. 15, cutouts 180 may also be formed, such as by machining, through the second end 110 of the first skin 102 and the first end 160 of the forward skin 114 to receive and/or host fittings 196.

Figure 18:
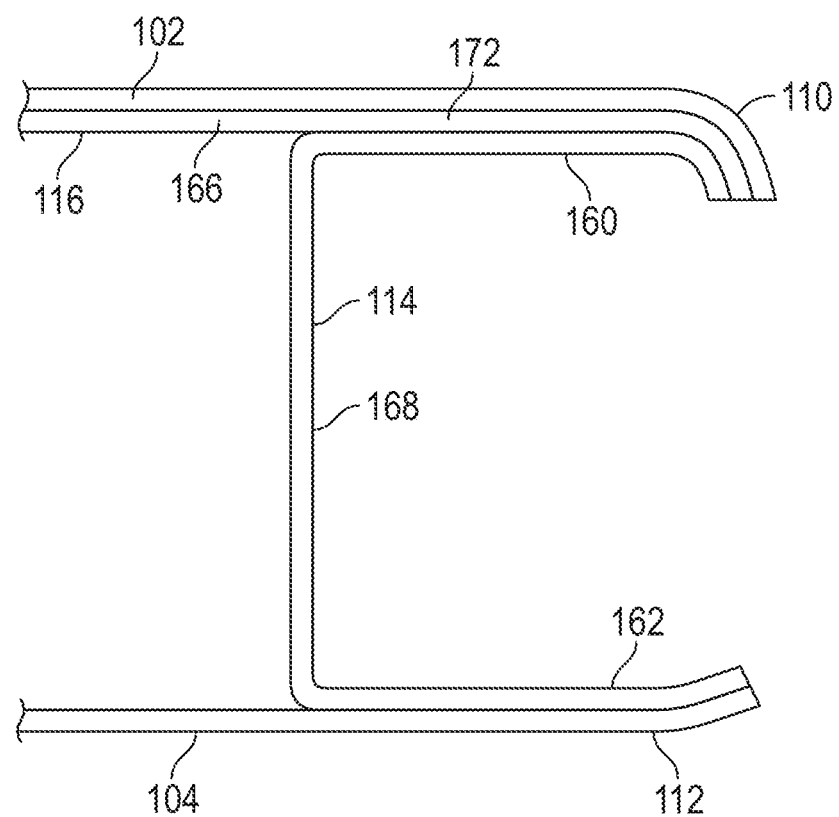
FIG. 18 is a close-up side view of a forward skin of a reinforcement structure in accordance with an exemplary embodiment.

It will be appreciated that, while FIGS. 15 and 17 illustrate one embodiment of reinforcement structure 194, other embodiments are possible. In one exemplary embodiment, as illustrated in FIG. 18, second end 162 of forward skin 114 is bonded to second end 112 of second skin 104. As illustrated in FIG. 13, wall 166 extends along and is bonded to first skin 102. Referring back to FIG. 18, wall 172 of corrugated spar 116, integral with wall 166, extends along first end 160 of forward skin 114 and is bonded to and is sandwiched between first end 160 and second end 110 of first skin 102. While not shown in FIG. 18, cutouts 170 can be formed, such as by machining, through second end 162 of forward skin 114 and second end 112 of second skin 104.

Similarly, cutouts 180 can be formed, such as by machining, through second end 110 of first skin 102, wall 172, and first end 160 of forward skin 114.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A composite reinforcement structure comprising:
   a first skin having a first end and a second end;
   a second skin having a first end and a second end, wherein the first end of the first skin and the first end of the second skin are coupled;
   a corrugated spar disposed between the first skin and the second skin and bonded to the first skin and the second skin; and
   a forward skin having a first end, a second end, and a forward skin wall interposed between the first end and the second end, wherein the first end of the forward skin is coupled to the second end of the first skin and the second end of the forward skin is coupled to the second end of the second skin, and wherein the corrugated spar is bonded to a portion of the forward skin wall.

2. The composite reinforcement structure of claim 1, wherein the first end of the first skin and the first end of the second skin are integral.

3. The composite reinforcement structure of claim 1, wherein the first end of the first skin and the first end of the second skin are bonded together.

4. The composite reinforcement structure of claim 1, wherein the corrugated spar extends from a first side of the first skin to a second side of the first skin.

5. The composite reinforcement structure of claim 1, wherein the corrugated spar comprises:
   a first wall; and
   a second wall that is adjacent to and integral with the first wall.

6. The composite reinforcement structure of claim 1, wherein the first end of the forward skin is bonded to the first skin.

7. The composite reinforcement structure of claim 1, wherein the second end of the forward skin is bonded to the second skin.

8. A composite reinforcement structure comprising:
   a first skin having a first end and a second end;
   a second skin having a first end and a second end, wherein the first end of the first skin and the first end of the second skin are coupled;
   a forward skin separating the second end of the first skin and the second end of the second skin;
   a first wall extending between the first skin and the second skin; and
   a second wall extending between the first skin and the second skin, wherein the second wall is adjacent to and integral with the first wall, wherein the forward skin has a first end, a second end, and a forward skin wall interposed between the first end and the second end, wherein the first end of the forward skin is coupled to the second end of the first skin and the second end of the forward skin is coupled to the second end of the second skin, wherein the first end of the forward skin is bonded to the first skin, wherein the second wall extends from the first skin to the forward skin wall and is integral with a third wall, and wherein the third wall is bonded to a portion of the forward skin wall and is bonded to and sandwiched between the second end of the forward skin and the second skin.

9. The composite reinforcement structure of claim 8, wherein the first end of the first skin and the first end of the second skin are integral.

10. The composite reinforcement structure of claim 8, wherein the first end of the first skin and the first end of the second skin are bonded together.

11. The composite reinforcement structure of claim 8, wherein the second end of the forward skin is bonded to the second skin, wherein the second wall extends to the forward skin wall, is bonded to the first skin and is integral with a third wall, and wherein the third wall is bonded to and sandwiched between the first end of the forward skin and the first skin.

12. An aircraft assembly comprising:
   a fixed lifting surface;
   a composite reinforcement structure comprising:
      a first skin having a first end and a second end;
      a second skin having a first end and a second end, wherein the first end of the first skin and the first end of the second skin are coupled; and
      a corrugated spar disposed between the first skin and the second skin and bonded to the first skin and the second skin;
      a forward skin having a first end, a second end, and a forward skin wall interposed between the first end and the second end, wherein the first end of the forward skin is coupled to the second end of the first skin and the second end of the forward skin is coupled to the second end of the second skin, and wherein the corrugated spar is bonded to a portion of the forward skin wall; and
   a plurality of fittings connecting the composite reinforcement structure to the fixed lifting surface.

13. The aircraft assembly of claim 12, wherein the fixed lifting surface is a wing of an aircraft.

14. The aircraft assembly of claim 12, wherein the composite reinforcement structure is an aileron of an aircraft.

15. The aircraft assembly of claim 12, wherein the corrugated spar comprises:
   a first wall; and
   a second wall that is adjacent to and integral with the first wall.

16. The aircraft assembly of claim 12, wherein the plurality of fittings include fittings selected from hinges, mechanical actuators, electrical actuators, and hydraulic actuators.

* * * * *